(12) United States Patent
Kim et al.

(10) Patent No.: US 8,080,281 B2
(45) Date of Patent: Dec. 20, 2011

(54) GROWTH AND APPLICATIONS OF ULTRALONG CARBON NANOTUBES

(75) Inventors: Philip Kim, New York, NY (US); Byung Hee Hong, Seoul (KR); Ju Young Lee, Daegu (KR); Kwang S. Kim, Pohang (KR)

(73) Assignees: The Trustees of Columbia University in the City of New York, New York, NY (US); Pohang University of Science and Technology, Pohang Gyungbuk (KR)

( * ) Notice: Subject to any disclaimer, the term of this patent is extended or adjusted under 35 U.S.C. 154(b) by 84 days.

(21) Appl. No.: 12/412,984

(22) Filed: Mar. 27, 2009

(65) Prior Publication Data

US 2009/0297847 A1    Dec. 3, 2009

Related U.S. Application Data

(63) Continuation of application No. PCT/US2007/020778, filed on Sep. 26, 2007.

(60) Provisional application No. 60/848,023, filed on Sep. 27, 2006, provisional application No. 60/848,024, filed on Sep. 27, 2006, provisional application No. 60/848,026, filed on Sep. 27, 2006.

(51) Int. Cl.
*C23C 16/00* (2006.01)
*B32B 1/00* (2006.01)

(52) U.S. Cl. .............. 427/249.1; 977/742; 977/752

(58) Field of Classification Search ............... None
See application file for complete search history.

(56) References Cited

U.S. PATENT DOCUMENTS

| | | | |
|---|---|---|---|
| 5,576,498 A * | 11/1996 | Shambayati | 73/861.52 |
| 2002/0173083 A1* | 11/2002 | Avouris et al. | 438/129 |
| 2002/0178846 A1* | 12/2002 | Dai et al. | 73/866.5 |
| 2005/0112051 A1* | 5/2005 | Liu et al. | 423/447.1 |
| 2006/0067871 A1 | 3/2006 | Hart et al. | |
| 2009/0099004 A1* | 4/2009 | Henderson et al. | 502/21 |

FOREIGN PATENT DOCUMENTS

| | | |
|---|---|---|
| WO | WO-2008/039496 A2 | 4/2008 |
| WO | WO-2008039496 A2 | 4/2008 |
| WO | WO-2008039496 A3 | 4/2008 |

OTHER PUBLICATIONS

"International Application Serial No. PCT/US2007/020778 International Search Report mailed May 29, 2008", 7 Pgs.

(Continued)

*Primary Examiner* — David Turocy
*Assistant Examiner* — Joseph Miller, Jr.
(74) *Attorney, Agent, or Firm* — Schwegman, Lundberg & Woessner, P.A.

(57) ABSTRACT

Ultralong carbon nanotubes can be formed by placing a secondary chamber within a reactor chamber to restrict a flow to provide a laminar flow. Inner shells can be successively extracted from multi-walled carbon nanotubes (MWNTs) such as by applying a lateral force to an elongated tubular sidewall at a location between its two ends. The extracted shells can have varying electrical and mechanical properties that can be used to create useful materials, electrical devices, and mechanical devices.

13 Claims, 11 Drawing Sheets

OTHER PUBLICATIONS

Collins, P. G., et al., "Engineering carbon nanotubes and nanotube circuits using electrical breakdown", *Science*, 292(5517), (Apr. 27, 2001), 706-9.

Cumings, J., et al., "Low-friction nanoscale linear bearing realized from multiwall carbon nanotubes", *Science*, 289(5479), (Jul. 28, 2000), 602-4.

Cumings, J., et al., "Peeling and sharpening multiwall nanotubes", *Nature*, 406(6796), (Aug. 10, 2000), 586.

Hong, B. H, et al., "Extracting subnanometer single shells from ultralong multiwalled carbon nanotubes", *Proceedings of the National Academy of Science*.vol. 102(4), (2005), 14155-14156.

Kim, K. S., et al., "Molecular Clusters of pi-Systems: Theoretical Studies of Structures, Spectra, and Origin of Interaction Energies", *Chem Rev.*, 100(11), (Nov. 8, 2000), 4145-86.

Kolmogorov, A. N., et al., "Smoothest bearings: interlayer sliding in multiwalled carbon nanotubes", *Phys Rev Lett.*, 85(22), (Nov. 27, 2000), 4727-30.

"International Application Serial No. PCT/US07/20778, International Search Report mailed May 29, 2008", 3 pgs.

"International Application Serial No. PCT/US07/20778, Written Opinion mailed May 29, 2008", 7 pgs.

Hong, B. H., et al., "Quasi-Continuous Growth of Ultralong Carbon Nanotube Arrays", *Journal of American Chemical Society*, 127, (2005), 15336-15337.

Kim, K. S., et al., "Molecular Clusters of $\pi$-Systems: Theoretical Studies of Structures, Spectra, and Origin of Interaction Energies", *Chem Rev.*, 100(11), (Nov. 8, 2000), 4145-4185.

\* cited by examiner

GROWTH AND APPLICATIONS OF ULTRALONG CARBON NANOTUBES

CLAIM OF PRIORITY

This patent application is a continuation under 35 U.S.C. 111(a) of International Application No. PCT/US2007/020778, filed Sep. 26, 2007 and published as WO 2008/039496 on Apr. 3, 2008, which claimed priority under 35 U.S.C. 119(e) to U.S. Provisional Ser. No. 60/848,023, entitled GROWTH AND APPLICATIONS OF ULTRALONG CARBON NANOTUBE ARRAYS, filed on Sep. 27, 2006; U.S. Provisional Patent Application Ser. No. 60/848,024, entitled QUASI-CONTINUOUS GROWTH OF ULTRALONG CARBON NANOTUBE ARRAYS, filed on Sep. 27, 2006; and U.S. Provisional Patent Application Ser. No. 60/848,026, entitled EXTRACTING SUBNANOMETER SINGLE SHELLS FROM ULTRALONG MULTI-WALLED CARBON NANOTUBES, filed on Sep. 27, 2006; which applications and publication are incorporated herein by reference and made a part hereof.

This patent application claims priority under 35 U.S.C. 119(e) to: (1) U.S. Provisional Patent Application Ser. No. 60/848,024, entitled QUASI-CONTINUOUS GROWTH OF ULTRALONG CARBON NANOTUBE ARRAYS, filed on Sep. 27, 2006, which is incorporated herein by reference; and (2) U.S. Provisional Patent Application Ser. No. 60/848,026, entitled EXTRACTING SUBNANOMETER SINGLE SHELLS FROM ULTRALONG MULTIWALLED CARBON NANOTUBES, filed on Sep. 27, 2006, which is incorporated herein by reference.

TECHNICAL FIELD

This document relates generally to nanotechnology, and more particularly, but not by way of limitation to growth and applications of ultralong carbon nanotubes.

BACKGROUND

Carbon nanotubes include generally tubular structures having a diameter on the order of a nanometer. Carbon nanotubes can provide unique electrical, mechanical, electro-optical, or electromechanical properties. Therefore, they may be useful as building blocks, such as for nanoscale electronic devices, molecular sensors, or the like.

OVERVIEW

Ultralong carbon nanotubes can be formed by placing a secondary chamber within a reactor chamber to restrict a flow to provide a laminar flow. Inner shells can be successively extracted from multi-walled carbon nanotubes (MWNTs) such as by applying a lateral force to an elongated tubular sidewall at a location between its two ends. The extracted shells can have varying electrical and mechanical properties that can be used to create useful materials, electrical devices, and mechanical devices. This document provides numerous examples in the detailed description, an overview of which is included below.

Example 1 describes a method. In this example, the method comprises providing a multi-walled carbon nanotube. The multi-walled carbon nanotube comprise first and second ends and an elongated side extending between the first and second ends. The multi-walled carbon nanotube includes at least lower order carbon nanotube. The lower order carbon nanotube comprises a carbon nanotube that is formed within another carbon nanotube. In this example, the method also comprises extracting at least one lower order carbon nanotube from within the multi-walled carbon nanotube via the elongated side of the multi-walled nanotube.

In Example 2, the method of Example 1 optionally is performed such that the act of extracting includes successively extracting lower order nanotubes.

In Example 3, the method of one or any combination of Examples 1-2 optionally is performed such that the act of extracting includes extracting a double-walled nanotube.

In Example 4, the method of one or any combination of Examples 1-3 optionally is performed such that the act of extracting includes extracting a lower order nanotube with a different conductivity property than the multi-walled carbon nanotube.

In Example 5, the method of one or any combination of Examples 1-4 optionally comprises supporting the at least one extracted lower order nanotube by a substrate.

In Example 6, the method of one or any combination of Examples 1-5 optionally comprises applying pressure to the elongated side of the multi-walled carbon nanotube to rupture the side of the multi-walled nanotube before performing the extracting.

In Example 7, the method of one or any combination of Examples 1-6 optionally comprises: coupling a probe to the elongated side of the multi-walled carbon nanotube; using the probe, moving the multi-walled carbon nanotube in a direction perpendicular to a longitudinal direction of the multi-walled carbon nanotube; breaking an outer portion of the multi-walled carbon nanotube, using the probe, thereby exposing at least one lower order carbon nanotube; and extracting at least one lower order carbon nanotube through a first break in the outer portion of the multi-walled carbon nanotube.

In Example 8, the method of one or any combination of Examples 1-7 optionally comprises breaking an outer portion of at least one lower order carbon nanotube, thereby exposing at least one further lower order carbon nanotube.

In Example 9, the method of one or any combination of Examples 1-8 optionally comprises forming the multi-walled carbon nanotube in a direction that is substantially parallel to a gaseous flow direction.

In Example 10, the method of one or any combination of Examples 1-9 optionally comprises forming the multi-walled carbon nanotube with a length limited by at least one of: a dimension of a surface, a dimension of a substrate, a dimension of a heated zone, or a flow characteristic.

In Example 11, the method of one or any combination of Examples 1-10 optionally comprises forming a nanotube catalyst, comprising: forming a catalytic precursor including ferric chloride; calcinating the catalytic precursor; and forming iron particles with a size and density determined by a molar concentration of the ferric chloride.

In Example 12, the method of one or any combination of Examples 1-11 optionally comprises patterning the catalytic precursor.

In Example 13, the method of one or any combination of Examples 1-12 optionally comprises patterning the catalytic precursor, wherein the act of patterning comprises at least one of drop drying, stamping, or photolithography.

In Example 14, the method of one or any combination of Examples 1-13 optionally comprises forming the multi-walled nanotube, which comprises: forming a catalyst on a surface in a chamber; providing a first gaseous flow in a first region of the chamber; and restricting the first gaseous flow in a second region of the chamber adjoining the surface to produce a second gaseous flow in the second region, the second gaseous flow being less turbulent than the first gaseous flow.

In Example 15, the method of one or any combination of Examples 1-14 optionally comprises forming a zero flow boundary region between the first and second regions.

In Example 16, the method of one or any combination of Examples 1-15 optionally comprises restricting a gaseous flow, wherein the restricting comprises generating a laminar flow by adjusting a first chamber dimension relative to a second chamber dimension.

In Example 17, the method of one or any combination of Examples 1-16 optionally comprises restricting a gaseous flow, wherein the restricting comprises generating a laminar flow by placing a tube in the chamber to create the second region within the tube such that the second gaseous flow is within the tube and is less turbulent than the first gaseous flow in the chamber and outside the tube.

Example 18 describes a carbon nanostructure manufacturing apparatus. In this example, the apparatus comprises a heating element; a first chamber region, coupled to the heating element, the first chamber region providing a first gaseous flow; and a second chamber region, located within the first chamber region, the second chamber region restricting the first gaseous flow to provide in the second chamber region a second gaseous flow that is less turbulent than the first gaseous flow, the second chamber region configured for housing a substrate for forming a carbon nanotube.

In Example 19, the apparatus of Example 18 is optionally configured such that the second chamber region is dimensioned and shaped to provide a second gaseous flow having a Reynolds number of less than 2000 and the first chamber region is dimensioned and configured to provide a first gaseous flow having a Reynolds number that exceeds 2000.

In Example 20, the apparatus of one or any combination of Examples 18-19 optionally is configured such that the first and second chamber regions define respective first and second longitudinal central axes.

In Example 21, the apparatus of Example 20 optionally is configured such that the first and second longitudinal central axes are substantially offset from each other.

In Example 22, the apparatus of Example 20 optionally is configured such that the first and second longitudinal central axes are substantially coincident with each other.

In Example 23, the apparatus of one or any combination of Examples 18-22 optionally comprises a first cylinder defining the first chamber region and a second cylinder defining the second chamber region.

Example 24 describes an apparatus comprising: M telescopingly coupled carbon nanotubes, each of the M nanotubes having an associated electronic band gap energy $E_{Mi}$; and N telescopingly coupled nanotubes, each of the N nanotubes having an associated electronic band gap energy $E_N$, wherein at least one of the M nanotubes is coupled to at least one of the N nanotubes.

In Example 25, the apparatus of Example 24 is configured such that the at least one of the M nanotubes that is coupled to the at least one of the N nanotube have substantially equal $E_M$ and $E_N$.

In Example 26, the apparatus of one or any combination of Examples 24-25 is optionally configured such that at least one of the M nanotubes that is coupled to the at least one of the N nanotube have substantially unequal $E_M$ and $E_N$.

In Example 27, the apparatus of one or any combination of Examples 24-26 optionally comprises P telescopingly coupled carbon nanotubes, each of the P nanotubes having an associated electronic band gap energy $E_P$, wherein at least one of the P nanotubes is coupled to at least one of the M nanotubes or to at least one of the N nanotubes.

In Example 28, the apparatus of Example 27 is optionally configured such that $E_P$ for the at least one P nanotube coupled to the at least one of the M nanotubes or the at least one of the N nanotubes substantially unequal to at least one of $E_M$ or $E_N$.

In Example 29, the apparatus of Example 27 is optionally configured such that $E_P$ for the at least one P nanotube coupled to the at least one of the M nanotubes or the at least one of the N nanotubes is substantially equal to at least one of $E_M$ or $E_N$.

Example 30 describes an apparatus comprising: a mechanical oscillator, comprising a plurality of telescopingly coupled carbon nanotubes; and wherein the plurality of telescopingly coupled carbon nanotubes are configured to provide coupled mechanical oscillations as a function of respective diameters of the nanotubes.

In Example 31, the apparatus of Example 30 is optionally configured such that the plurality of telescopingly coupled carbon nanotubes are configured in a necklace-like structure.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
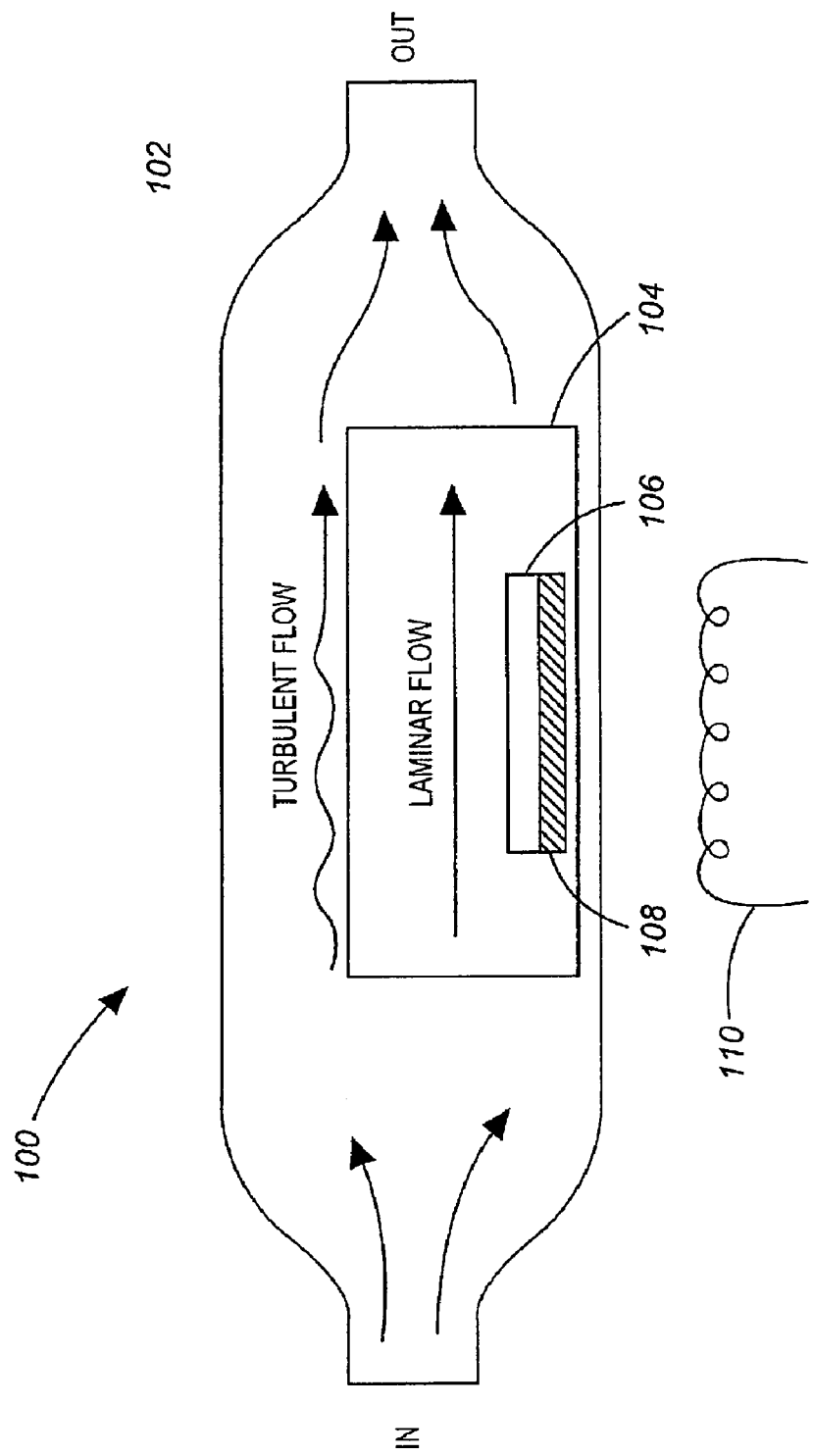
FIG. 1 illustrates an example of a growth apparatus.

Multi-walled carbon nanotubes (MWNTs) can be used to form many new electronic, optical, or mechanical devices. A MWNT provides an elongated tubular structure that extends between first and second ends, and that carries at least one other nanotube, which can be referred to as a lower order nanotube or shell. A MWNT can carry a single-walled carbon nanotube (SWNT), which does not carry another nanotube within, or a MWNT can carry a lower order MWNT, which does carry another nanotube within. In certain examples, MWNTs can be formed that carry up to twenty concentric shells. The ends of the MWNTs are closed, as are the ends of the successively carried lower order inner shells. An inner shell can be extracted from its MWNT outer shell in a telescope-like manner.

In an example, a lower order inner shell is extracted from its outer shell by burning off an end cap of the outer shell with an electrode, then spot welding a mechanical probe to the end of the exposed inner shell, and then pulling on the mechanical probe to extract the inner shell. Removal of the end cap by this process is typically performed under vacuum in a transmission electron microscope (TEM) with the MWNT attached to fixture at one end. The process may not be practical for several reasons. First, the extracted shell, including any of its concentric inner nanotubes, is not free-standing, but rather is supported at one end by the fixture and at the other end by the mechanical probe. Second, the next inner shell cannot be extracted without burning off the end cap of the extracted shell—but that end cap has been welded to the probe. If the probe is removed (to enable the end cap to be removed) the unsupported extracted nanotube can collapse or retract into its outer shell under Van der Waals force. Therefore, this process does not provide a practical method for successively extracting inner shell nanotubes from a carrier outer shell nanotube.

Growth of long MWNTs can be challenging. Chemical vapor deposition (CVD) can typically produce a MWNT with a length that is on the order of 50 microns or less. In such an example, a fully extracted 20-shell MWNT would have an end-to-end length that is less than 1 cm. This is four times less that a typical maximum length obtained for a SWNT. If a particular diameter nanotube is desired to be extracted from a MWNT, it is limited to the length of the outermost shell of the MWNT. While longer SWNTs can be grown, a single, fixed diameter shell does provide the design flexibility or structural characteristics of MWNTs. For example, inner shells of the MWNT have a hierarchical mechanical structure and a hierarchical electronic band gap structure that can be exploited. Moreover due to its concentric nature and the multiplicity of inner shells, a MWNT can be mechanically stronger than a SWNT. The additional strength of the MWNT can be used in a material to make it stronger.

Discrete devices can be fashioned from MWNTs, but often with limited lengths. One fabrication method involves burning away an outer shell and sequentially working inward in a selected region by a current-induced electrical breakdown mechanism. Electrodes can be placed on the surface of the outermost shell. A current is passed between the electrodes. At a high enough current, defects form along the outmost shell. This increases the shell's electrical resistance, which, in combination with the current, causes it to get very hot. In ambient air, the outermost shell oxidizes and eventually vaporizes. A third electrode can be placed in contact with an outermost shell, such as between the two current electrodes. A bias voltage can be applied to the third electrode, such as to induce carrier depletion, thereby inhibiting current flow between the first and second electrodes and protecting the selected region of the shell in which the current is inhibited. Such a shell-by-shell process is time consuming, and therefore, is not readily scalable. For MWNTs of limited length, device manufacture may be impractical. MWNT length limitations, therefore, can inhibit developing new device structures and materials. Thus, the present inventor has recognized that there is a need for long MWNTs and for improved processing technologies.

The MWNTs described herein can include one or more nanotubes with semiconducting properties or one or more nanotubes with metallic properties. Such nanotubes can also be doped, such as to adjust electrical properties or to form a specific device structure. Electrical conduction between concentrically adjoining nanotubes can be low enough to inhibit the flow of electrical charge between them. Therefore, as described in further detail below, complex electrical interconnection, devices, or circuits can be formed from MWNTs.

FIG. 1 illustrates an example of a growth apparatus. In this example, a reactor 100 includes an outer chamber 102 and an inner chamber 104. The inner chamber 104 is shorter than the outer chamber 102. A substrate 106 is placed inside the outer chamber 102, such as within the inner chamber 104. A heat source 110 is coupled to the reactor 100, such as to provide heat to the substrate 106. The heat source 110 can be coupled to a current, voltage, or radio frequency (RF) source such as a microwave generator. The substrate 106 can be supported by a susceptor 108, which may be a source of heat. The susceptor 108 can include a resistive heating element. In certain examples, the susceptor 108 can be made of alumina or silicon carbide coated with a metal catalysts, such as iron and cobalt.

An average boundary layer thickness of a gaseous stream flowing over a flat surface can be represented by the approximation $$\overline{\Delta} = (1/L) \int_0^L \delta(x)\,dx = (2/3)L/(Re_L)^{1/2}$$

where L is the length of the flat surface, δ(x) is the boundary layer thickness, and $Re_L$ is the Reynolds number. A Reynolds number can help characterize flow by providing a measure of a ratio of the inertial forces to the viscous forces. A small Reynolds number indicates that viscous forces predominate. A large Reynolds number indicates that inertial forces predominate. For a reactor 100 with a tubular geometry, the Reynolds number can be expressed by ρvd/γ, where ρ is the density of the gasses, v is the velocity of gas steam, d is the tube diameter, and γ is the kinematic coefficient of viscosity. In general, laminar flow exists in a region if the associated Reynolds number for the region is less than about 2000. Thus, the Reynolds number can be used to distinguish laminar flow from turbulent flow, such as where a reactor region providing laminar flow is desired. In particular, for growing long carbon nanotubes, it can be desirable to provide laminar flow in the region adjacent to the surface of the substrate.

The outer chamber 102 and an inner chamber 104 can cooperate in generating a laminar flow in the inner chamber, even when there exists more turbulent flow in the outer chamber. Each chamber can be sized and positioned relative to the other so as to create and maintain laminar flow in the inner chamber 104 during growth of carbon nanotubes. In an example, the outer chamber 102 and the inner chamber 104 are non-concentric, horizontally aligned tubes, such as shown in FIG. 1. In the example of FIG. 1, a longitudinal center axis of the tubular outer chamber 102 is offset from a longitudinal center axis of the tubular inner chamber 104. In other examples, the inner chamber 104 and the outer chamber 102 are in concentric alignment. The outer chamber 102 and the inner chamber 104 can have different shape cross-sections, but the inner chamber 104 will restrictively guide the first gaseous flow in the outer chamber 102 to produce a less turbulent and preferably laminar second gaseous flow within the inner chamber 104. This technique can provide a stable gaseous flow pattern at a leading edge of a growing nanotube at the substrate 106. Some examples of such tubular cross-sections include a square, a rectangle, a polygon, a circle, or an ellipse. Although the reactor 100 is shown as a horizontal arrangement of chambers, a vertical arrangement can also be used, such as to provide laminar flow in the boundary layer adjoining the surface of the substrate 106 during carbon nanotube growth.

Since the Reynolds number of a gaseous flow is a function of gas viscosity and gas density, the geometry of the inner chamber 104 can be adjusted to accommodate various flows of various reaction gasses or concentrations. Chamber pressures in the outer chamber 102 or the inner chamber 104 can likewise be adjusted, such as to obtain laminar flow adjacent to the substrate 106. The ability to adjust chamber pressure, inner chamber 104 geometry, or outer chamber 102 geometry, can advantageously provide a degree of latitude in the chemical composition or dilution of the reaction gases that can be used.

Figure 2:
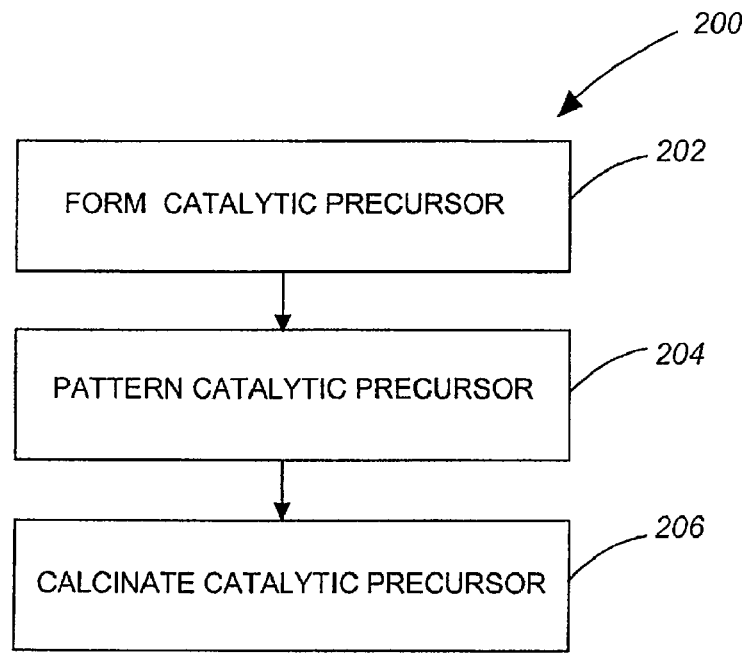
FIG. 2 illustrates an example of a method.

FIG. 2 illustrates an example of a method 200. At 202, a catalytic precursor is formed. The catalytic precursor can be used for generating a carbon nanotube growth catalyst. In an example, the catalytic precursor comprises a solution of $FeCl_3$ having a molar concentration ranging from of 0.001 to 0.1 in a mixture of water and ethanol. At 204, the catalytic precursor can be patterned at desired locations near a substrate edge or anywhere else on a substrate 106, such as by drop drying or stamping. The precursor can also be patterned by spin drying or by photolithographic processes, such as using a photoresist or a polyimide. The substrate 106 can be any suitable material resistant to deformation at the high temperatures used for carbon nanotube growth. Some examples of substrates include silicon, silicon carbide, gallium nitride, or oxides or nitrides of silicon, aluminum, tantalum, titanium, tungsten, or the like. The substrate 106 can have a flat surface to receive the catalytic precursor for carbon nanotube growth.

At 206, the patterned catalytic precursor is calcinated. In an example, the patterned catalytic precursor is calcinated at a temperature of about 950° C. for 30 minutes in mixture of hydrogen flowing at 60 sccm and argon flowing at 200 sccm. Other inert gases can be substituted for the argon. In this example of the process, this results in formation of iron particles on a surface of the substrate 106. The relationship between the catalytic precursor and the resulting iron catalyst can be described by the balancing equation

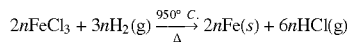

$$2nFeCl_3 + 3nH_2(g) \xrightarrow[\Delta]{950° C.} 2nFe(s) + 6nHCl(g)$$

where n is an integer value greater than or equal to 1. The resultant iron particles can serve as a catalyst for initiating growth of carbon-based nanotubes, such a SWNTs and MWNTS, or other structures.

After the desired pattern or arrangement of iron particles is formed, carbon nanotubes can be grown from such locations of the iron particles. The size and density of the iron particles can depend upon the molar concentration of the $FeCl_3$. The number of MWNTs formed relative to the number of SWNTs can also depend on the molar concentration of $FeCl_3$, as illustrated in Table I. In general, if the preference is toward an increasing number of SWNTs, the molar concentration of $FeCl_3$ can be decreased. The average diameter of the nanotube also decreases with a deceasing molar concentration of $FeCl_3$ in the precursor solution.

TABLE I

| | Precursor Concentration (in water & ethanol) | | |
|---|---|---|---|
| | $FeCl_3$ 0.1M | $FeCl_3$ 0.01M | $FeCl_3$ 0.001M |
| Dominant Shell Type | MWNT | MWNT + SWNT | SWNT |
| Average Diameters | 3.3 nm | 2.4 nm | 1.8 nm |
| Standard Deviation | 1.0 nm | 0.7 nm | 0.4 nm |

Figure 3:
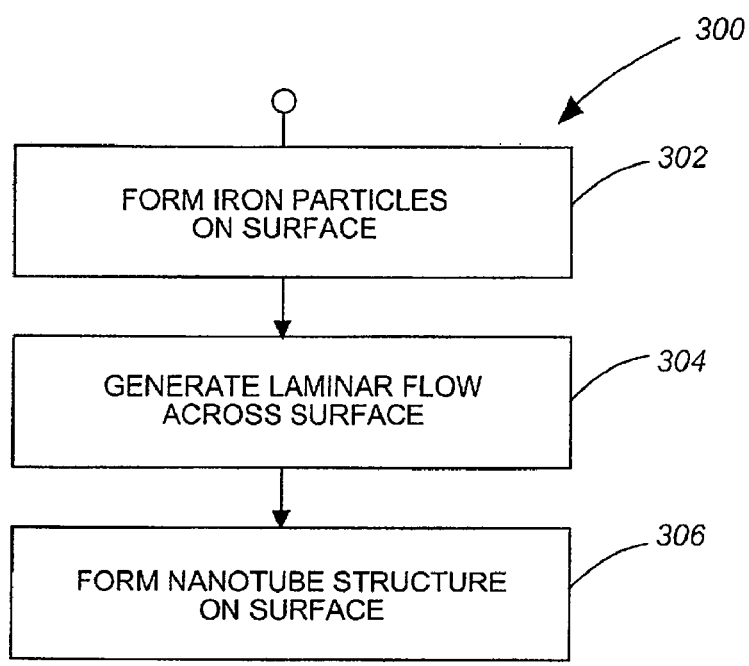
FIG. 3. illustrates an example of a method.

FIG. 3. illustrates an example of a method 300. At 302, iron particles are formed on a surface of a substrate 106. The iron particles can be formed using method 200, as described above. In certain examples, catalytic precursors with molar concentrations ranging from 0.001 to about 0.1 $FeCl_3$ are patterned on an $SiO_2$ surface of a silicon wafer substrate 106. Each iron particle can serve as a catalyst for a nanotube growth. Therefore, in certain examples, a linear arrangement of multiple iron particles can be positioned to receive a perpendicular gas flow so as to serve as catalysts for forming an array of nanotubes extending along the surface of the substrate in a direction that is perpendicular to the linear arrangement of the multiple iron particles.

The iron particles can be formed on a surface of the substrate 106 in the same reactor 100 used to grow the nanotube structures described herein. Iron particles can also be formed on a substrate 106 in a first reactor, and then the substrate 106 can be transferred to second reactor 100 that is configured for growing carbon nanotubes. If so, the outer surfaces of the iron can be protected from oxidation or the accumulation of carbon-containing compounds. For example, a volatile material that does not react with iron can be formed over the iron particles, or the iron particles can be enclosed in inert atmosphere or vacuum environment before and during the transfer. For example, a vacuum environment can be provided with a load-locked chamber coupling the reactor used for generating the iron catalyst with the reactor used for nanotube growth. Similarly, a vacuum "briefcase" can also be used during transfer of the substrate 106 between reactors.

At 304, laminar gaseous flow conditions are created across the surface of the substrate 106 carrying the iron particles that are used as catalysts for carbon nanotube growth. Laminar flow conditions near the surface of the substrate 106 can be promoted by suitably adjusting the Reynolds number for the flow, such as by selecting one or more growth or apparatus parameters. For example, laminar flow conditions can be promoted by adjusting at least one of a reactor geometry, a gas flow rate, a gas composition, a gas viscosity, a gas density, or a chamber pressure. In certain examples, laminar flow is promoted at a boundary region adjoining the surface of the substrate 106. Advantageously, such laminar flow can be promoted by using the inner chamber 104 and outer chamber 102 as described with respect to FIG. 1. In certain examples, laminar flow is promoted in a reactor region including a boundary region adjoining the surface of the substrate. Once laminar flow is obtained, the conditions responsible for laminar flow can be varied in a manner that helps maintain the laminar flow in the boundary region adjoining the substrate 106.

At 306, nanotube structures are formed extending longitudinally away from the iron particles. During formation, the resulting nanotube structures can extend above and along a top surface of the substrate 106; when the gaseous flow ceases, the resulting nanotube structures will typically fall back to rest upon the top surface of the substrate 106. Elongated MWNTs longer than 10 cm can be grown a temperature of about 950° C. in a 30 cm long reactor 100. Carbon nanotube growth temperatures ranging between about 920° C. and about 970° C. can be used. Methane flowing at a rate of 100 sccm and hydrogen at a rate of 60 sccm can be concurrently introduced into reactor 100 and passed over a top surface of the substrate for 3 hours. A Reynolds number of 50 near the top surface of the substrate 106 in the reactor 100 is estimated for the above parameters. An increasing Reynolds number generally yields a decreasing nanotube length.

Figure 4:
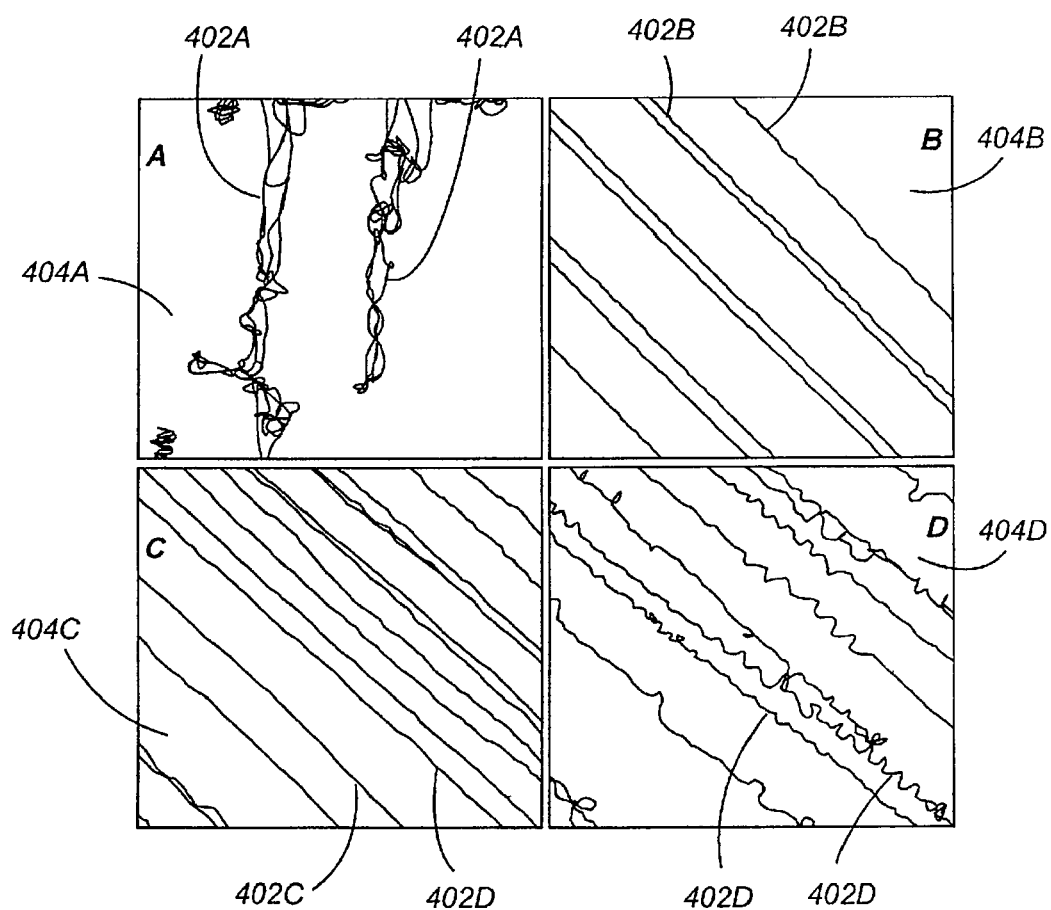
FIGS. 4A-4D illustrate examples of nanotubes.

FIGS. 4A-4D illustrate certain examples of resulting nanotubes, such as can be obtained using the processes and apparatuses described herein. FIG. 4A is a surface view of carbon nanotubes grown under turbulent flow conditions in the boundary region adjoining a $SiO_2$ surface of a silicon substrate 404A. The corresponding catalytic precursor concentration was 0.1 M FeCl₃. In the example of FIG. 4A, the resulting nanotube structures 402A are irregularly shaped and are predominately SWNTs.

FIGS. 4B-C illustrate examples of surface views of carbon nanotubes grown with laminar flow in the boundary region adjoining an SiO₂ surface of silicon substrates 404B-C. In these examples, the Reynolds number is estimated at about 50. The catalytic precursor concentrations used in this example for the nanotube growth are 0.01 M FeCl₃ for FIG. 4B and 0.1 M FeCl₃, for FIG. 4C, respectively. Nanotube structures 402B and 402C are regularly shaped and predominately MWNTs. The growth direction of the elongated nanotube structures is substantially parallel to the direction of laminar gas flow. In contrast, FIG. 4D illustrates an example in which, for a Reynolds number of 50 and a concentrations 0.001 M FeCl₃, the resulting nanotube structures 402D are predominantly SWNTs. However, under laminar flow obtainable using the apparatus of FIG. 1 and these conditions, the resulting SWNTs are more regularly shaped than those grown with a less laminar and more turbulent flow.

The growth apparatus and processes described herein permit formation of MWNTs and SWNTs of lengths that need not be structurally limited by end cap formation or growth dynamics. The MWNT and SWNT structures can be grown as long as the configuration of the reactor 100 and the substrate 106 permits. In the above-described examples, a silicon substrate 106 was selected merely because it is readily available at a low cost; it can easily provide a reusable, ultra-flat surface with lengths of up to 300 mm. Therefore, using such a substrate 106, up to 30 cm long MWNTs can be formed—which, when inner shells are successively extracted, can yield total lengths of up to 6 meters for a fully extracted MWNTs with 20 shells. Other substrates can also be used, such as sapphire or silicon carbide, for example. By increasing the length of the heated zone and by use of longer substrates, MWNTs with even greater lengths may be grown.

Figure 5:
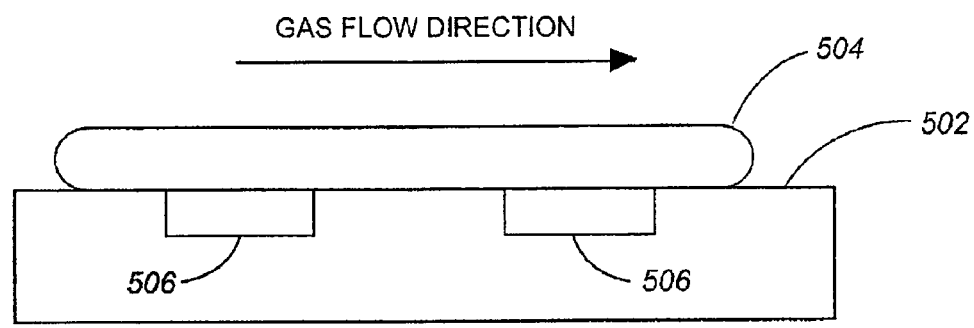
FIG. 5 illustrates an example of a nanotube.

FIG. 5 schematically represents an example of a nanotube that can be formed such as described herein. In the example of FIG. 5, trenches 506 or even via through holes can be formed in a substrate 502. In an example, the trenches 506 can have widths ranging from 100-500 microns and depths of 0.5 mm. The reactor geometry and growth processes described in FIGS. 1-3 can be used to generate laminar gas flow across the surface of the substrate 502, such as in a direction that is substantially perpendicular to the trenches 506. In this example, a nanotube 504 structure can be grown across such trenches 506 as a single, continuous SWNT or MWNT. Therefore, under such conditions, the trenches 506 apparently do not substantially disrupt the laminar flow obtained in the boundary layer adjoining the surface using the processes and apparatuses described above.

Thus, the substrate 106 need not be unitary. Instead, planar substrates can be sawn perpendicular to a surface, polished along the sawn edge and butted against one another to form a continuous substrate that provides an arbitrary length platform for nanotube growth. As made clear by FIG. 5, a separation between adjoining substrates can be at least 500 microns. Laminar flow can be maintained in the surface boundary regions of the adjoining substrates to form elongated SWNTs and MWNTs across the boundary regions as continuous structures. Production extremely long SWNTs and MWNTs is therefore possible. The reactor can be lengthened while maintaining laminar flow conditions by distributing or otherwise employing one or more vacuum pumps to increase the mean free path of the gas, and to adjust the thickness of the boundary layer adjoining the growth surfaces. A moving growth platform arrangement can also be used with a sequentially differentially pumped chamber, such as to permit removal of arrays of SWNTs and MWNTs without introducing contamination or having to stop the growth process.

Before nanotube growth, the trenches 506 can be filled with a metal, such as a refractory metal, or a conductive metal alloy having a high melting point. A chemical mechanical planarization (CMP) process can by used to planarize trenches 506 so that nanotube 504 forms and electrically contacts the metal. Such cross-connects can be used, for example, to form interconnections such as substrate wordlines or bitlines, particularly where the nanotube 504 exhibits a conductive property. This technique can also be used to form gated transistors or logic circuits, such as when the nanotube 504 exhibits a semiconducting property, such as described below.

Figure 6:
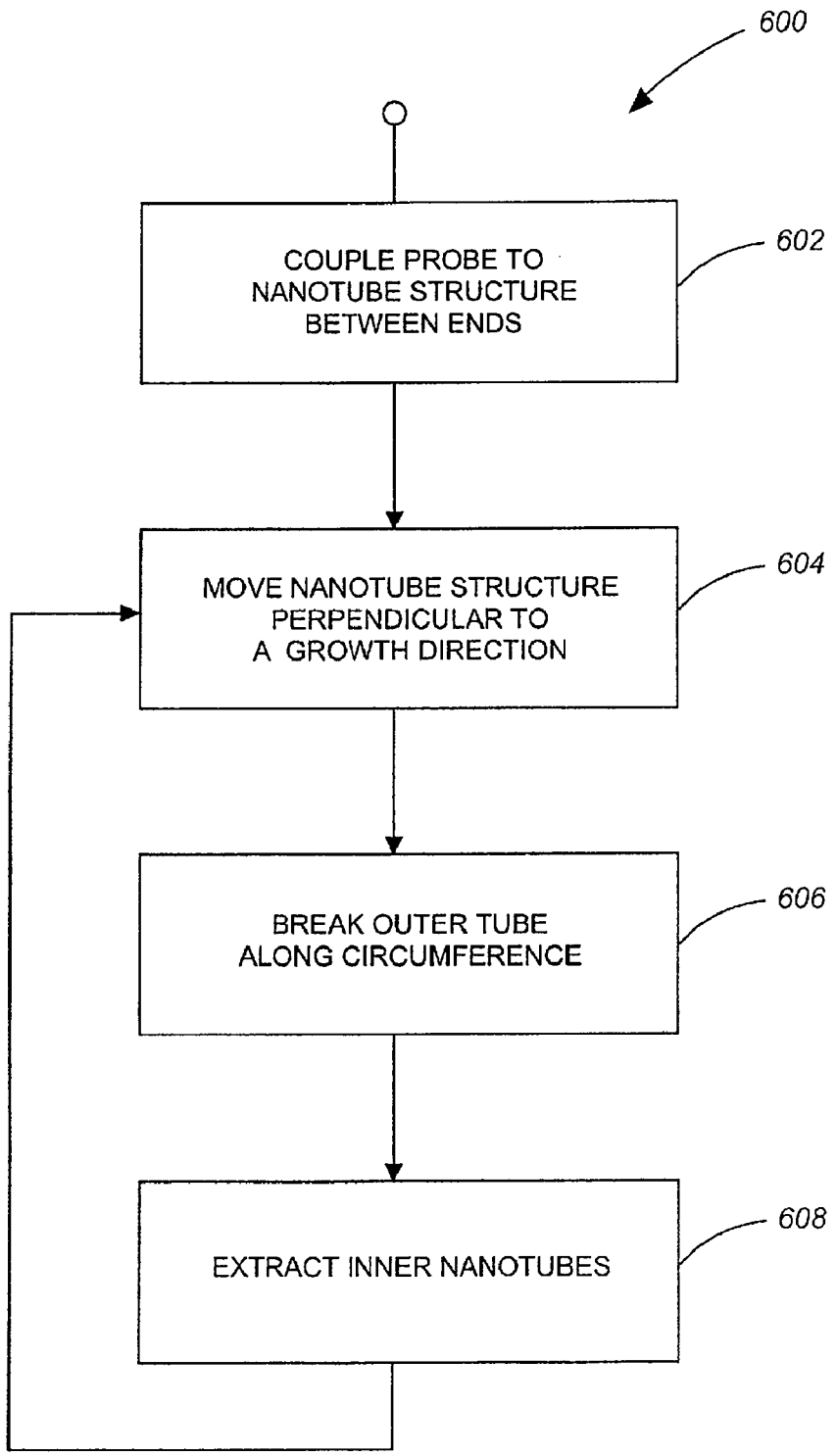
FIG. 6 illustrates an example of a method of extracting nanotubes.

FIG. 6 illustrates an example of a method 600 of extracting one or more lower order inner nanotube shells from a carrying outer shell. At 602, a probe is coupled to an elongated sidewall portion between the ends of an outer shell of a MWNT structure. The force coupling the probe to the outer shell can be a cohesive mechanical contact force or an electrostatic force sufficient to apply pressure. In an example, an atomic force microscope (AFM) tip is coupled to an outer shell of a MWNT supported by a substrate, such as in a direction substantially parallel to its growth direction.

At 604, the probe is moved a direction that is substantially perpendicular to the elongated growth direction of the MWNT. In certain examples, an AFM tip is moved at a rate of between 0.5-0.8 cm/s in a direction substantially perpendicular to the elongated growth direction. The MWNT may be laterally pushed or pulled by the probe. Such movement in effect, drags the MWNT across the surface of the substrate in a general direction that is perpendicular to the nanotube growth direction.

At 606, the lateral probe movement and continues until a tensile strength (e.g., between 10 GPa and 100 GPa, due to friction between the MWNT and the substrate's surface) is exceeded. When this occurs, the outer shell of the MWNT circumferentially ruptures, thereby exposing the next inner shell. This exposed next inner shell can carry other nanotubes, or it can be the inner-most nanotube, which does not carry any other nanotubes. If desired, the probe can then be used to couple to the exposed next inner shell, such as by cohesive mechanical contact or electrostatic force, such as to apply pressure to such next inner shell to either telescopingly extract or rupture the next inner shell, as desired.

At 608, the probe is moved in a direction other than in the elongated growth direction. Adjacent concentric nanotubes are coupled together by Van der Waals forces. This Van der Waals force between adjacent concentric nanotubes can be overcome by applying pressure with the mechanical probe, such that the next inner shell can be telescopingly extracted, along with any further nanotube shells contained therein. This process of successively extracting the next inner shell can continue until the critical tensile strength is again reached for the next inner shell. This ruptures the next inner shell, thereby exposing any further inner shell(s) carried therewithin. The extraction process can be repeated until there are no further inner shells remaining to extract. The extraction process can be used to completely extract an inner shell from its carrier outer shell, or an overlapping region can be retained, such that the combination of adjacent shells together form a longer cohesive structure, in a manner similar to a retractable and extendable telescope.

The length of a shell that can be extracted before circumferentially breaking is influenced by friction between the substrate and shell undergoing extraction. The extraction length can be increased if probe is used to guide the shell being extracted above the surface of the substrate to reduce such friction. Surface friction can also be reduced by use of a suitable surface lubricant or by using a surface with low friction coefficient. The shells need not be extracted on the growth surface; for example, a MWNT can be moved to another surface before extracting inner shells from a MWNT.

Figure 7:
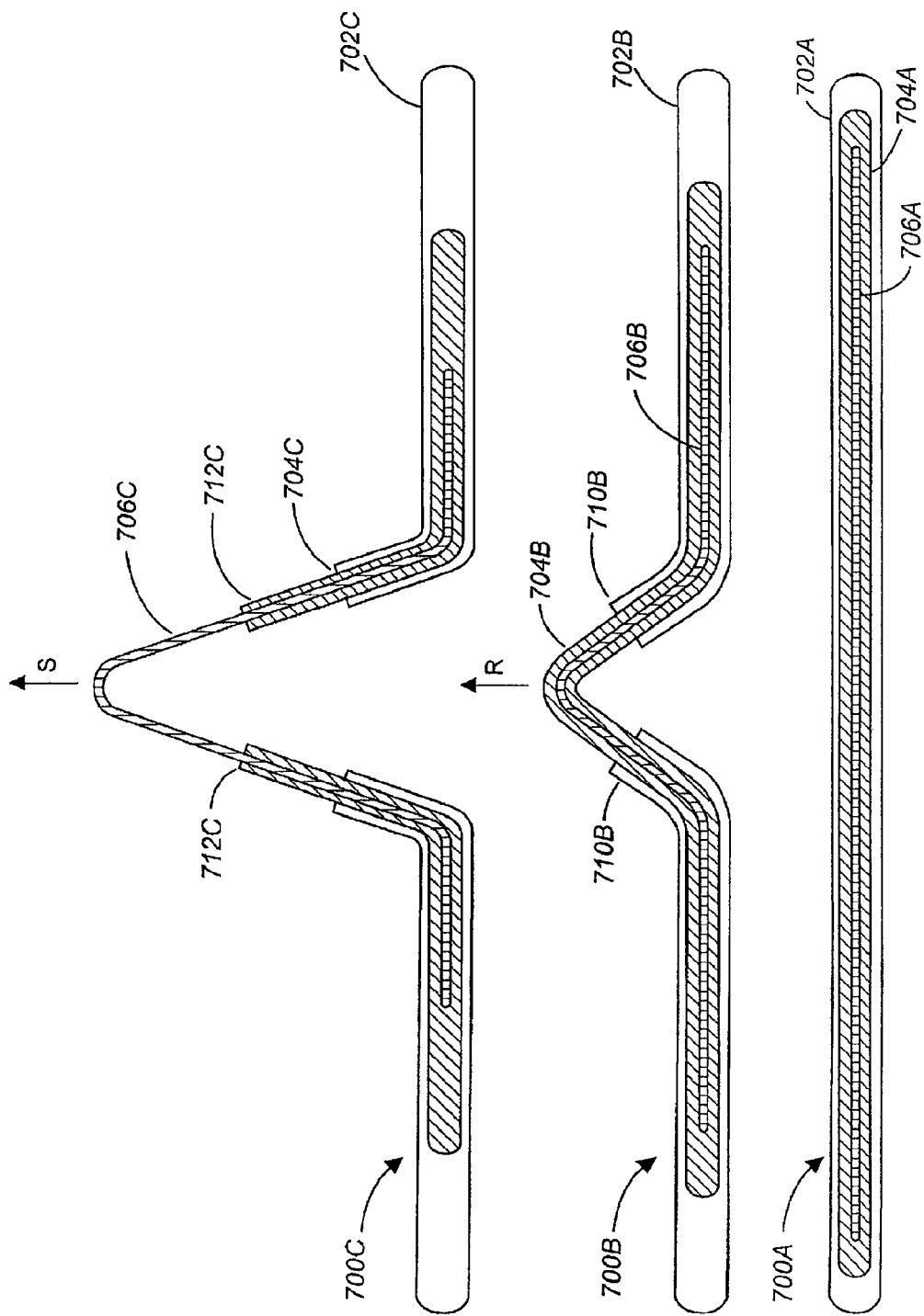
FIG. 7 is a cross-sectional view that illustrates an example of a nanotube.

FIG. 7 illustrates an example of a cross-sectional view of a MWNT undergoing successive shell extraction such a described above with respect to the method 600. For illustrative clarity, this example only shows three shells, however, a different number of shells can be used. Before extraction, the MWNT 700A includes outermost shell 702A and successive concentric inner shells 704A and 706A of approximately equal length.

MWNT 700B illustrates subsequent partial extraction of shells 704B and 706B through a circumferential break 710B in the elongated side portion between the ends of nanotube 702B. In this illustrative example, the lengths of shells 704B and 706B remaining within the shell 702B are approximately equal. The arrow R represents the general direction of probe movement.

MWNT 700C illustrates subsequent partial extraction of shell 706C through a circumferential break 712C in the elongated side portion between the ends of nanotube 704C. If shell 706C carried one or more other shells, further extraction can similarly be performed. The arrow S represents the general direction of probe movement. Friction between shell 704C and the substrate surface can be used to inhibit nanotube 704C from being drawn through break 710B back into nanotube 702C by Van der Waal forces.

Figure 8:
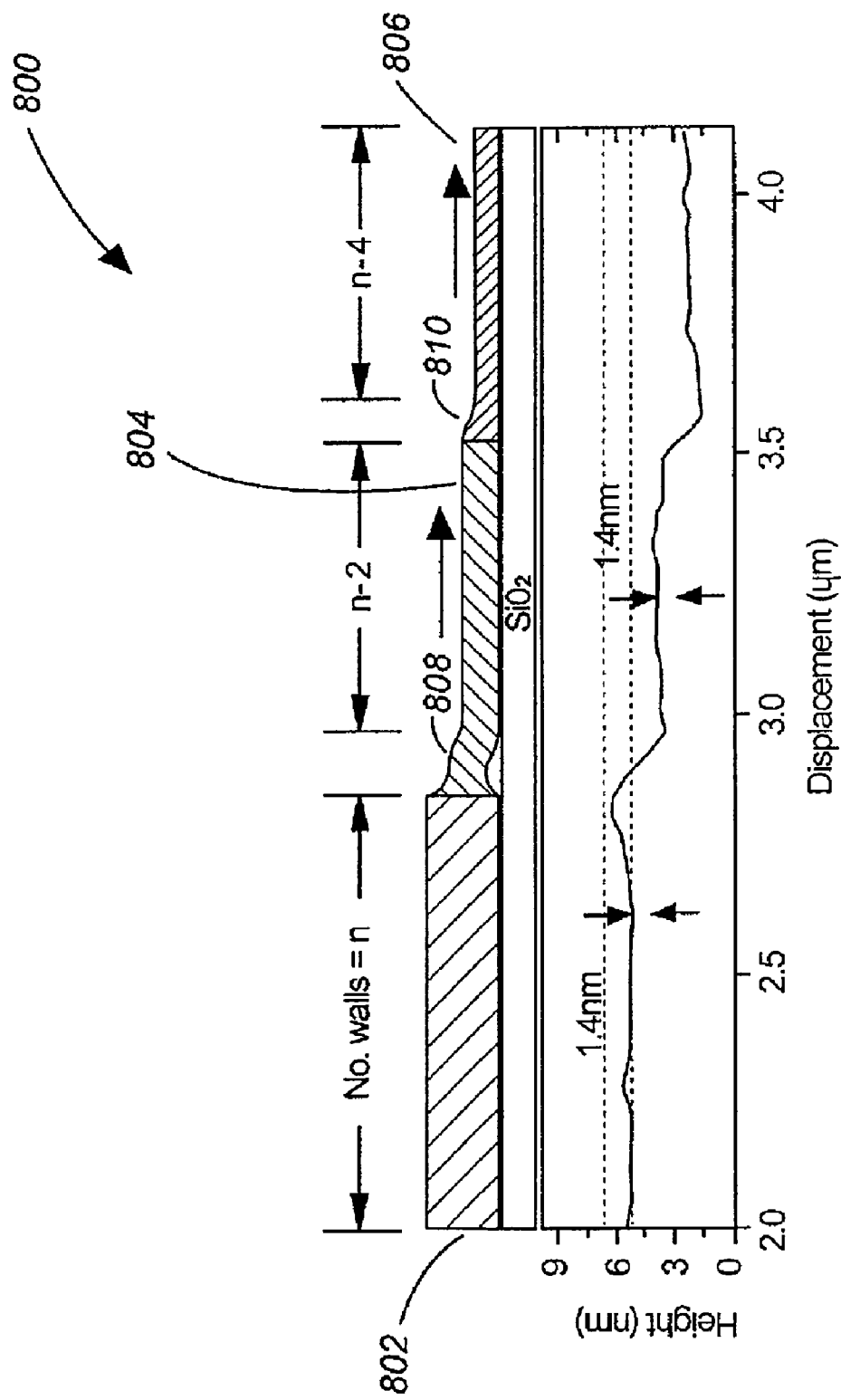
FIG. 8 is a side view illustrating an example of a nanotube.

FIG. 8 is a side view illustrating an example of a nanotube structure. In this example, double-walled nanotubes (DWNTs) are successively extracted from a MWNT. A DWNT comprises a pair of SWNTs coupled together by an additional deforming force. The arrows indicate the direction of probe movement. The corresponding height profile is also shown in FIG. 8. FIG. 8 shows that there is a step change in the diameter of the MWNT 802 of about 1.4 nm in the vicinity where DWNTs 804 and 806 are extracted through breaks 808 and 810, respectively. The successive change in diameter is about four times the intershell spacing of 0.35 nm. The plateau lengths for DWNTs 804 and 806 are up to 500 μm. SWNTs extracted under similar conditions provide plateau lengths of about 100 μm. The greater lengths of the extracted DWNTs may be due to increased friction between DWNT shells arising from surface induced deformation of the outer shell of the pair. Therefore, the DWNT may be particularly useful for providing strength in materials, such as in strengthening fabrics and building materials.

Figure 9:
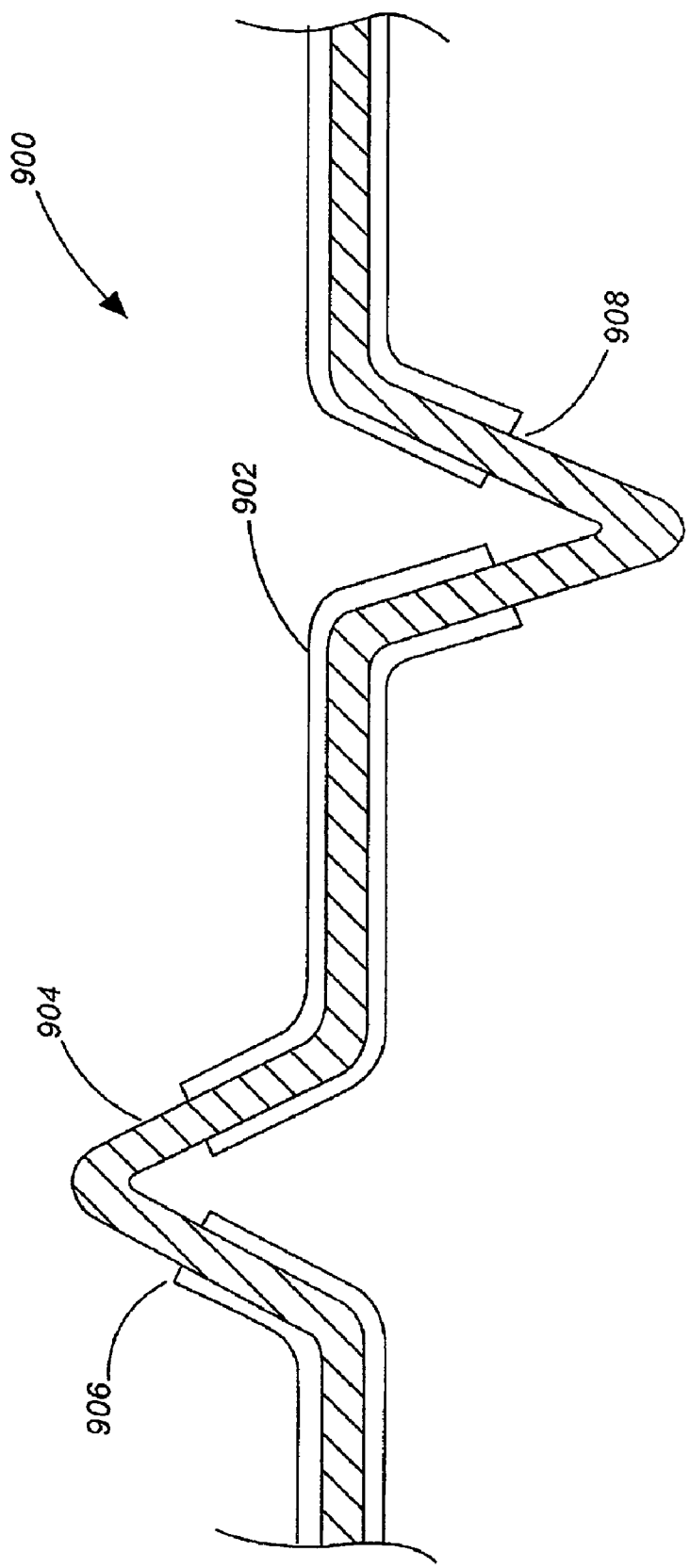
FIG. 9 is a cross-sectional view illustrating an example of a nanotube.

FIG. 9 is a cross-sectional view of an example of a nanotube, such as can be formed using the method 600 described above. For illustrative clarity, only two shells are shown here, however, a different number of shells could be used. In this example, the MWNT 900 includes an outer shell 902 carrying a concentric inner shell 904, which, in turn, can carry one or more other shells. In this example, the shell 902 is broken circumferentially at locations 906 and 908 on the elongated side between the ends of the MWNT 900. In this example, the shell 904 can be partially extracted in opposite directions. This illustrates the mechanical flexibility of the structure. The shell 902 can be further broken at a third or more different locations as desired. Although FIG. 9 illustrates MWNT 900 with nanotubes being extracted in opposing directions, shell 904, and any shells carried therein, can be extracted at any desired angle. This includes extraction perpendicular to the plane of the substrate surface supporting the MWNT 900. This added degree of dimensional freedom permits forming complex patterns of nanotubes using the MWNTs and methods described. For example, flexible interleaved structures can be formed of SWNTs, DWNTs, or MWNTs to strengthen materials such as glues, adhesives, concrete mixtures, metals, metal alloys, and articles of clothing. The SWNTs, DWNTs, or MWNTs can be separated from a substrate's surface and randomized to form a wool-like pattern. Carbon nanotube structures can be woven or twisted together forming a cable-like structure to further increase strength. Thread, cable and mesh arrangements may also be incorporated in other materials to increase overall strength, for example, in materials used for airframes, automobile bodies, automobile body parts, wallboard, flexible armor, bulletproof vests, transport containers, and the like. Since stable and flexible SWNTs, DWNT, or MWNTs are formed at high temperatures, they may be usable in forming light-weight fire retardant fabrics. Such fabrics include children pajamas, firefighting equipment, fire shelters, furnace insulation, or the like.

Figure 10A:
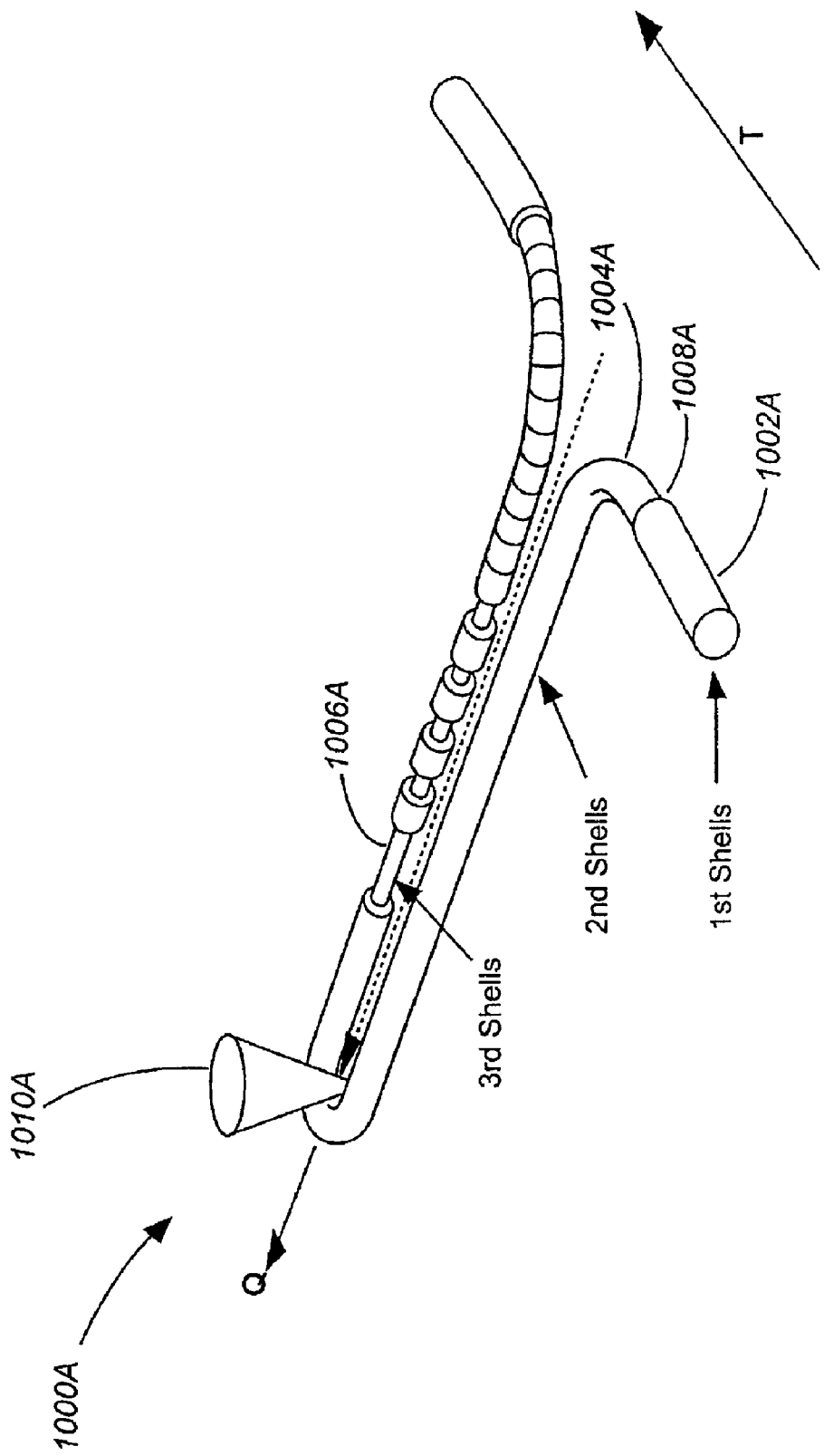
FIGS. 10A-B illustrate an example of a multi-walled carbon nanotube.

FIG. 10A illustrates an example of a MWNT arrangement. For illustrative clarity, this example shows only three shells, however, a different number of shells could be used. In the example of FIG. 10A, a fast extraction (e.g., a shell extraction velocity of greater than about 0.1 min/sec) is used to draw a plurality of inner nanotube shells from within the outer tube of the MWNT 1000A. In this example, the MWNT 1000A includes an outer shell 1002A and the successive next two inner shells, 1004A and 1006A, respectively. During extraction, the outer shell 1002A can be circumferentially broken at 1008A. This can be accomplished by moving a probe 1010A, while it is coupled at a location along the elongated tubular sidewall extending between the ends of MWNT 1000A. The probe can be moved in a direction (indicated by arrow Q) that is approximately perpendicular to the elongated growth direction (indicated by arrow T). By continuing to move probe 1001 in this direction, the next inner shells 1004A and 1006A can be extracted. In this example, the shell 1004A undergoes repeated breaking along its circumference, thereby exposing shell 1006A and forming portions 1014A in a region that is not coupled to the probe. The shell 1006A can include one shell, or it can carry additional shells. This extraction process can be used to form of a quasi-periodic structure. The probe velocity or the friction forces between the shells being extracted and a supporting substrate surface may be adjusted, such as to vary a length of portions 1014A.

Figure 10B:
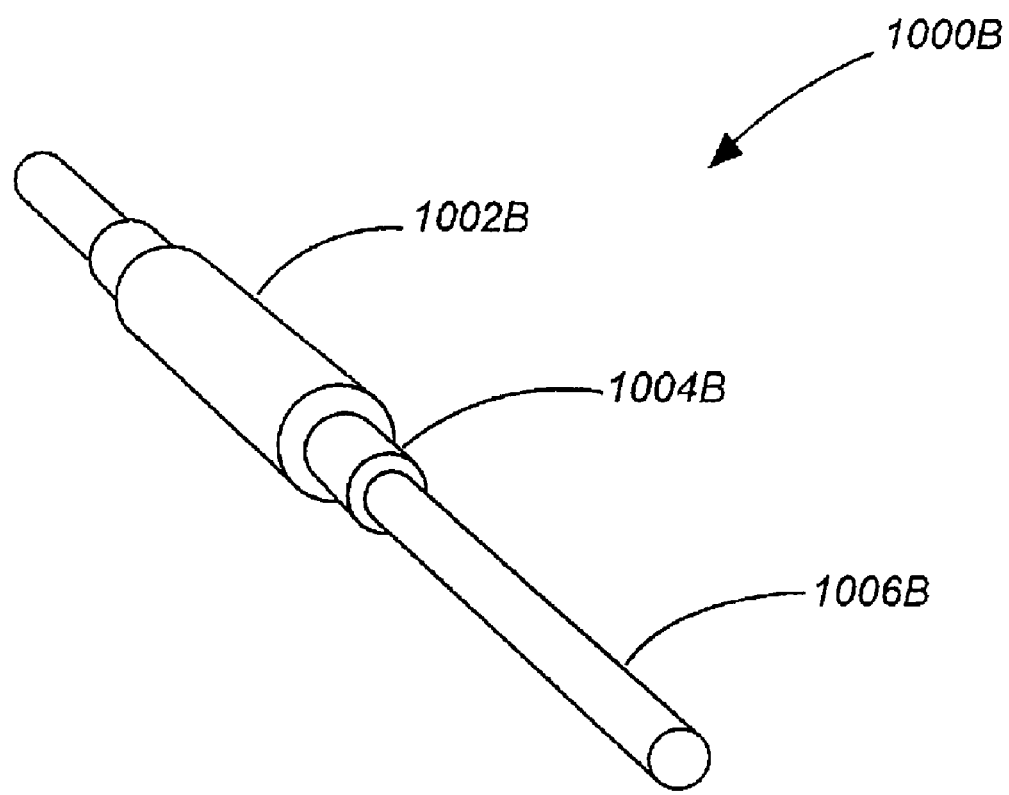

FIG. 10B illustrates an example of a useful resulting MWNT structure. For illustrative clarity, this example shows only three shells, however, a different number of shells could be used. In this example, the MWNT 1000B includes concentric shells 1002B, 1004B, and 1006B. The shell 1006B can carry one or more additional shells. The MWNT 1000B can be one of the portions 1014A described above. A SWNT has a radial breathing mode that is approximately inversely proportional to its diameter $d_n$ $$\omega_n \alpha 1/d_n$$

where $\omega_n$ is its mechanical frequency of oscillation. Therefore, a MWNT with n shells can have at least n localized oscillation frequencies. These oscillations can occur with frequencies in the GHz range. For example, if MWNT 1000B is one of the portions 1014A, each such portion can have substantially the same mechanical oscillation frequencies. In certain examples, the oscillation can be coupled to increase an oscillation magnitude at a specified frequency. The oscillation can also be coupled, in certain examples, to generate frequencies having in-phase and out-of-phase locked modes. The mechanical oscillation can also be coupled in such a way as to generate one or more beat frequencies. Such characteristics can be used to make devices such as mechanical resonators, switches, or transducers operating in the GHz range.

The MWNT structures disclosed herein can include nanotubes having semiconducting properties or metallic/conducting properties. Each inner shell carried within a MWNT has an associated band gap energy. The band gap energies are generally inversely proportional to the shell diameter. Extracted nanotube shells can also include portions having both semiconducting and metallic properties. The length of a nanotube shell, its diameter, and conductivity type can be selected to provide a specified conduction characteristic. The nanotubes may be doped to further modify the electrical characteristics. Because inter-shell conduction can be low enough to inhibit charge transfer between concentrically adjoining nanotubes, the electrical properties of a nanotube can be exploited to form various band gap engineered interconnected structures.

Figure 11:
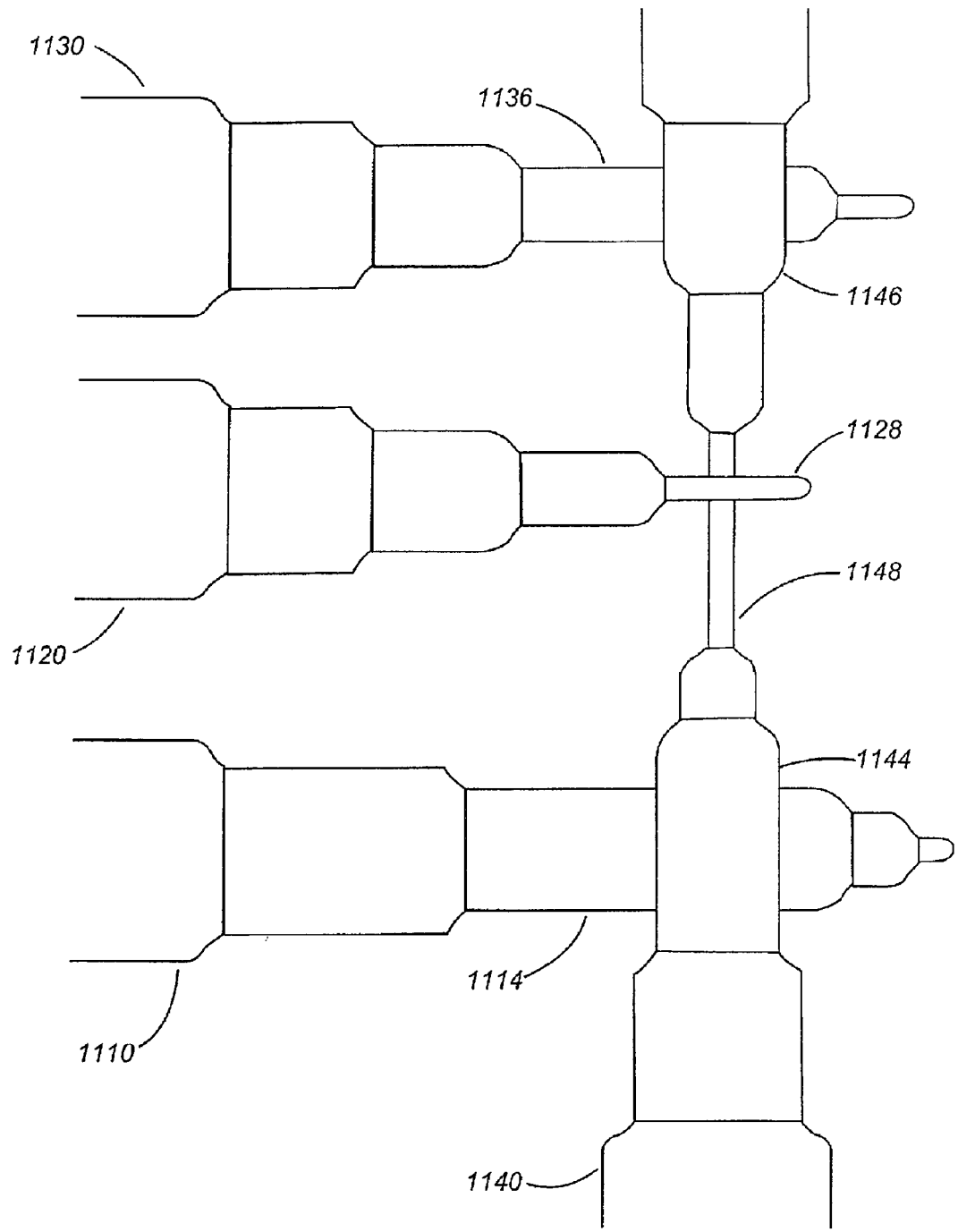
FIG. 11 is a surface view illustrating an example of an interconnected structure.

FIG. 11 is a surface view illustrating an example of an interconnect structure. In this example, only four MWNTs are shown for illustrative clarity, however, a different number of MWNTs or shells could be used. MWNT 1110, 1120, 1130 and 1140 can include a different numbers of inner shells. One or more of MWNT 1110, 1120, 1130 and 1140 be can be extracted from a same or a different base MWNT (not shown). MWNT 1110, 1120, 1130 and 1140 can have metallic properties, or same or different semiconducting properties. The lower order inner shells can be extracted to a desired length.

In this example, the shells 1114 and 1144 are in contact, the shells 1128 and 1148 are in contact, and the shells 1136 and 1146 are in contact. Each of these shells can be in further contact with one or more other structures or devices. Each shell can also form a portion of an electronic device, such as a transistor. For example, if the shell 1146 has metallic properties and the shell 1136 has semiconducting properties, a Schottky contact can be formed and the two shells form a Schottky diode. If the shell 1128 and the shell 1148 each have semiconducting properties, then a semiconductor junction can be formed with a band gap energy discontinuity, if desired. If the shells 1128 and 1148 are coupled to a bias potential, the region providing the band gap energy discontinuity can be used to block carrier flow or to enhance carrier injection. If the shells 1128 and 1148 have opposite conductivity types, then a p-n junction can be formed. If the shells 1114 and 1144 each have metallic properties, then metal-like interconnection can be formed. Therefore, by the appropriate connection of the shells, p-n junction diodes, Schottky diodes, field effect transistors (FETs), and bipolar junction transistors (BJTs) can be formed from the shells of MWNTs 1110, 112, 1130, and 1140. Since the extraction of the inner shells yields different electrical properties than the outer shell, the extraction can play an important role in tailoring the electrical characteristics to obtain the desired device. Such devices can provide building-blocks that can be integrated at the nanoscale level, such as by interconnection using shells having metallic properties. This further permits more complex electrical and electromechanical structures such as photodetectors, memory cells, voltage controlled oscillators, heterodyne circuit and the like to be fabricated from the ultralong MWNTs disclosed herein, and the shells that can be extracted therefrom.

Closing Notes

The above Detailed Description includes references to the accompanying drawings, which form a part of the Detailed Description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the term "subject" is used to include the term "patient." In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more features thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A method, comprising:
   providing a first gaseous flow in a first chamber region; and
   dividing the first gaseous flow to provide, in a second chamber region located within the first chamber region, a second gaseous flow that is less turbulent than the first gaseous flow;
   housing a substrate for forming a multi-walled carbon nanotube within the second chamber region; and
   forming the multi-walled carbon nanotube, using the substrate, in a direction that is substantially parallel to a direction of the second gaseous flow.

2. The method of claim 1, wherein forming the multi-walled carbon nanotube comprises forming a multi-walled carbon nanotube of length exceeding 10 centimeters.

3. The method of claim 1, wherein the multi-walled carbon nanotube comprises first and second ends and an elongated side extending between the first and second ends, the multi-walled carbon nanotube including at a least lower order carbon nanotube, wherein the lower order carbon nanotube comprises a carbon nanotube that is formed within another carbon nanotube, the method further comprising:

extracting at least one lower order carbon nanotube from within the multi-walled carbon nanotube via the elongated side of the multi-walled nanotube.

4. The method of claim 3, wherein extracting includes successively extracting lower order nanotubes.

5. The method of claim 3, wherein extracting includes extracting a double-walled nanotube.

6. The method of claim 3, wherein extracting includes extracting a lower order nanotube with a different conductivity property than the multi-walled carbon nanotube.

7. The method of claim 3, comprising supporting the at least one extracted lower order nanotube by a substrate.

8. The method of claim 3, comprising applying pressure to the elongated side of the multi-walled carbon nanotube to rupture the side of the multi-walled nanotube before performing the extracting.

9. The method of claim 8, further comprising:
coupling a probe to the elongated side of the multi-walled carbon nanotube;
using the probe, moving the multi-walled carbon nanotube in a direction perpendicular to a longitudinal direction of the multi-walled carbon nanotube;
breaking an outer portion of the multi-walled carbon nanotube, using the probe, thereby exposing at least one lower order carbon nanotube; and
extracting at least one lower order carbon nanotube through a first break in the outer portion of the multi-walled carbon nanotube.

10. The method of claim 9, further comprising breaking an outer portion of at least one lower order carbon nanotube, thereby exposing at least one further lower order carbon nanotube.

11. The method of claim 1, wherein forming the multi-walled carbon nanotube includes forming the multi-walled nanotube with a length limited by at least one of: a dimension of a surface, a dimension of a substrate, a dimension of a heated zone, or a flow characteristic.

12. The method of claim 1, further comprising selecting a size of the first chamber region and the second chamber region and positioning the second chamber region in the first chamber region so that the second gaseous flow is less turbulent than the first gaseous flow.

13. The method of claim 1, comprises further comprising at least one of adjusting a pressure within the first chamber region or adjusting a pressure within the second chamber region.

* * * * *

UNITED STATES PATENT AND TRADEMARK OFFICE
CERTIFICATE OF CORRECTION

| | |
|---|---|
| PATENT NO. | : 8,080,281 B2 |
| APPLICATION NO. | : 12/412984 |
| DATED | : December 20, 2011 |
| INVENTOR(S) | : Philip Kim et al. |

It is certified that error appears in the above-identified patent and that said Letters Patent is hereby corrected as shown below:

In column 16, line 21, in Claim 13, after "claim 1," delete "comprises".

Signed and Sealed this
Twentieth Day of March, 2012

David J. Kappos
*Director of the United States Patent and Trademark Office*